United States Patent [19]

Bessouat et al.

[11] Patent Number: 4,667,733
[45] Date of Patent: May 26, 1987

[54] PROTECTIVE DEVICE FOR HEAT EXCHANGERS PLACED IN A DUCT FOR SMOKE FILLED WITH FINE PARTICLES OF ASH

[75] Inventors: Roger Bessouat, Paris; Jean-Claude Mevel, Les Ulis; Michel Vandycke, Paris, all of France

[73] Assignee: Stein Industrie, Velizy-Villacoublay, France

[21] Appl. No.: 813,816

[22] Filed: Dec. 27, 1985

[30] Foreign Application Priority Data

Aug. 14, 1985 [FR] France ................................ 85 12405

[51] Int. Cl.$^4$ ................................................ F28F 9/00
[52] U.S. Cl. .................................. 165/134.1; 165/159
[58] Field of Search ...................... 165/133, 159, 134.1

[56] References Cited

U.S. PATENT DOCUMENTS

| 2,110,024 | 3/1938 | Miller ................................ 165/159 |
| 2,303,247 | 11/1942 | Woods ............................... 165/159 |
| 2,496,540 | 2/1950 | Holmes et al. ....................... 237/8 R |
| 2,559,069 | 7/1951 | England .............................. 138/42 |
| 2,847,192 | 8/1958 | Smith et al. ......................... 165/159 |
| 3,568,763 | 3/1971 | Stoker .......................... 165/134.1 X |
| 4,007,908 | 2/1977 | Smagghe et al. .................. 138/41 X |
| 4,586,564 | 5/1986 | Hagemeister ....................... 165/159 |

FOREIGN PATENT DOCUMENTS

| 0123569 | 10/1984 | European Pat. Off. . |
| 301900 | 8/1914 | Fed. Rep. of Germany ...... 165/159 |
| 2293674 | 7/1976 | France . |
| 0162400 | 12/1981 | Japan ................................ 165/159 |
| 0090596 | 6/1982 | Japan ................................ 165/133 |
| 490727 | 8/1938 | United Kingdom ................ 165/159 |
| 633365 | 12/1949 | United Kingdom . |
| 653540 | 5/1951 | United Kingdom . |
| 2100405A | 12/1982 | United Kingdom ................ 165/159 |

OTHER PUBLICATIONS

Patents Abstract of Japan, vol. 7, No. 89, (M-297)[1234], Apr. 13, 1983; & JP-A-58 13 987 (Sasakura Kikai Seisakusho K.K.) 26-01-1983.

*Primary Examiner*—Albert W. Davis, Jr.
*Assistant Examiner*—Randolph A. Smith
*Attorney, Agent, or Firm*—Sughrue, Mion, Zinn, Macpeak, and Seas

[57] ABSTRACT

The present invention relates to a device for protecting heat exchangers placed in a duct (1) for smoke filled with fine particles of ash, e.g. coming from a pulverized coal boiler. The heat exchangers are constituted by parallel grids (10) each comprising a main region (A) fitted with rectilinear lengths (11) of tube extending perpendicularly to the direction of smoke movement, and two end regions (B) fitted with bends (12) and rectilinear lengths (13) of tube extending parallel to the direction of smoke movement. The protective device is constituted by parallel panels (20) which are parallel to the grids (10) of tubes, with each panel (20) being placed between two grids (10) and at each end region (B).

3 Claims, 6 Drawing Figures

PROTECTIVE DEVICE FOR HEAT EXCHANGERS PLACED IN A DUCT FOR SMOKE FILLED WITH FINE PARTICLES OF ASH

The present invention relates to a device for protecting heat exchangers placed in a duct for smoke filled with fine particles of ash.

BACKGROUND OF THE INVENTION

Large pulverized coal boilers, which may be used in power stations or in factories, are equipped with a smoke duct fitted with heat exchanger tubes, with the smoke and the accompanying fine particles of ash passing round the outside of the heat exchanger tubes.

Such heat exchangers may be horizontal or vertical, and they are constituted by parallel grids comprising a main region having rectilinear tubes extending perpendicularly across the direction of smoke movement, and two end regions of smaller size having bends and lengths of tube lying parallel to the direction of smoke movement.

The average speed of smoke movement through such heat exchangers is generally limited to between 10 and 15 meters per second (m/s) in order to avoid the tubes being eroded by the coal ash, which may be highly abrasive, depending on the nature of the coal.

However, by virtue of their particular shape and the inevitable gaps between the walls of the duct and the closest adjacent tubes lying parallel to the direction of smoke movement, the end regions have a lower head loss coefficient than the main region. As a result, large local excess speeds generally occur in the end regions, which speeds may, for example, be as much as twice the average design speed of smoke movement, thereby causing the tubes to be locally eroded. This leads to major re-conditioning operations which are expensive and which take the boiler out of service.

Prior art devices are generally constituted by obstacles disposed upstream from the heat exchangers in order to provide a baffle effect. Such devices only protect the inlet to the heat exchangers and therefore do not provide them with complete protection. Further, regions of major excess speed may form at the ends of such obstacles. and may be accompanied by considerable concentrations of ash, thereby giving rise to local erosion.

The aim of the invention is to provide complete protection to the heat exchangers by avoiding any local regions of excess speed and any regions of ash concentration.

SUMMARY OF THE INVENTION

The present invention provides a protective device for protecting heat exchangers placed in a duct for smoke filled with fine particles of ash, the heat exchangers being constituted by parallel grids each comprising a main region fitted with rectilinear lengths of tube extending perpendicularly to the direction of smoke movement, and two end regions fitted with bends and with rectilinear lengths of tube extending parallel to the direction of smoke movement, the protective device being constituted by a plurality of panels located between each adjcent pair of grids of tubes in each of said end regions, said panels extending parallel to the grids of tubes.

The protective device is designed in such a manner as to set up a head loss coefficient in the region where it is located which is at least equivalent to that which exists in the main region of the grids.

Advantageously, each panel is constituted by an assembly having an active portion which presents the smoke with an obstacle which is substantially equivalent to the obstacle presented by the main region constituted by the lengths of rectilinear tubes extending perpendicularly to the direction of smoke movement.

In a first embodiment, each panel is generally triangular in shape and covers the ends of the rectilinear tubes which are parallel to the direction of smoke movement.

In a second embodiment, each panel is generally rectangular in shape and covers an entire end region.

BRIEF DESCRIPTION OF THE DRAWINGS

Embodiments of the invention are described by way of example with reference to the accompanying drawings, in which.

MORE DETAILED DESCRIPTION

Figure 1:
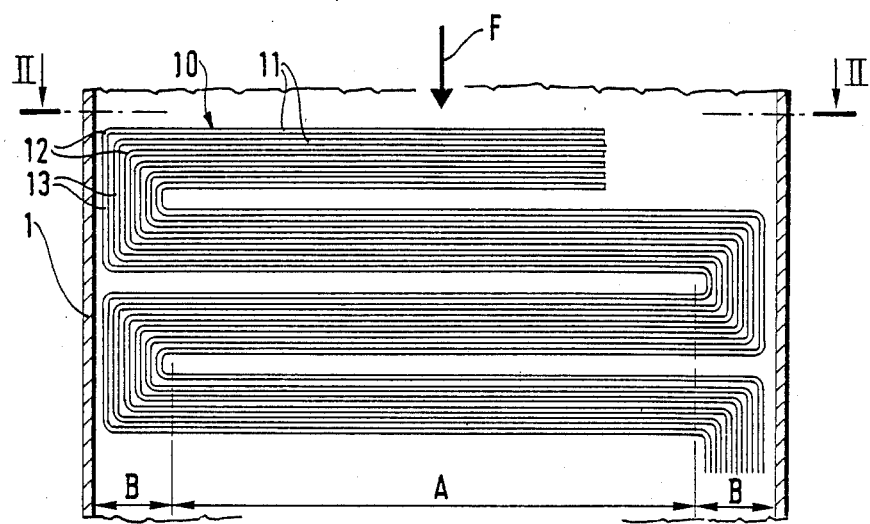
FIG. 1 is a front view of a grid of tubes placed inside a vertical smoke duct.

FIG. 1 shows the duct 1 and a single grid 10 made up of tubes, with an arrow F showing the direction of smoke movement.

Each tube comprises a plurality of rectilinear lengths 11 perpendicular to the direction of smoke movement, a plurality of bends 12, and a plurality of rectilinear lengths 13 parallel to the direction of smoke movement. All the rectilinear lengths 11 perpendicular to the direction of smoke movement constitute a main region A. All the bends 12 and all the rectilinear lengths 13 lying parallel to the direction of smoke movement represent two end regions B where the risks of erosion are situated.

Figure 2:
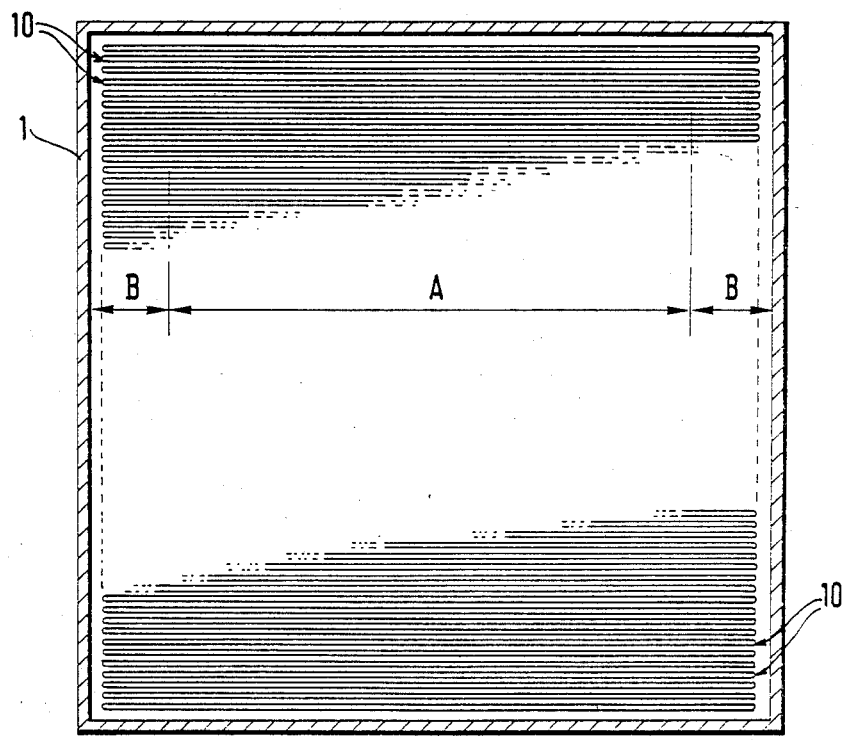
FIG. 2 shows the duct in section on a line II of the FIG. 1.

FIG. 2 is a section through the duct 1 and shows the position of all the grids 10 which are placed parallel to one another.

The present invention thus consists in placing protective devices at each end B and between all the spaces left free between adjacent pairs of grids 10.

Figure 3:
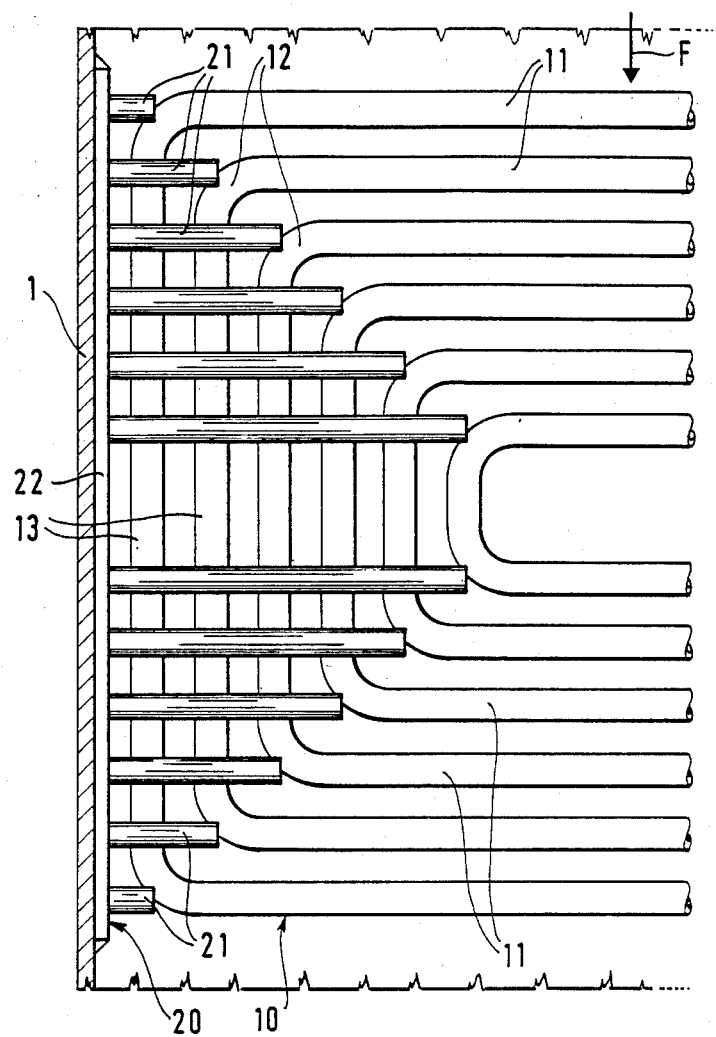
FIG. 3 shows a first embodiment of the device.

FIG. 3 shows one end of a grid 10 of tubes which is covered by a device in accordance with the invention. This device 20 is constituted by tubes 21 which are parallel to one another and which are connected at one end to a support plate 22 which is fixed to the wall of the duct 1. Plate 22 and spaced tubes 21 form an open framework device 20. The various connections are made by any suitable known means. Advantageously, each tube 21 ends level with a bend 12 in order to provide the best possible re-constitution of the head loss coefficient of the lengths 11.

Figure 4:
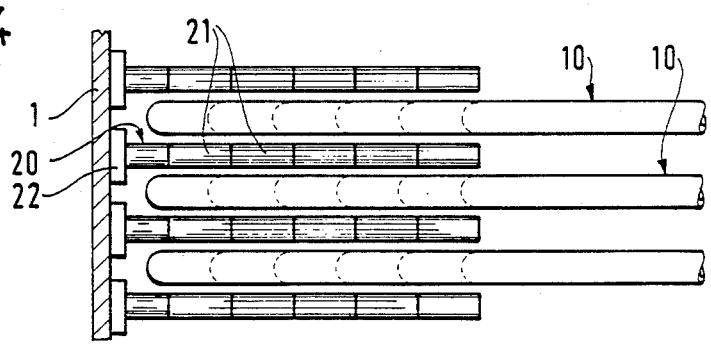
FIG. 4 is a plan view of a portion of FIG. 3.

FIG. 4 shows the position of a device 20 between two grids 10.

Figure 5:
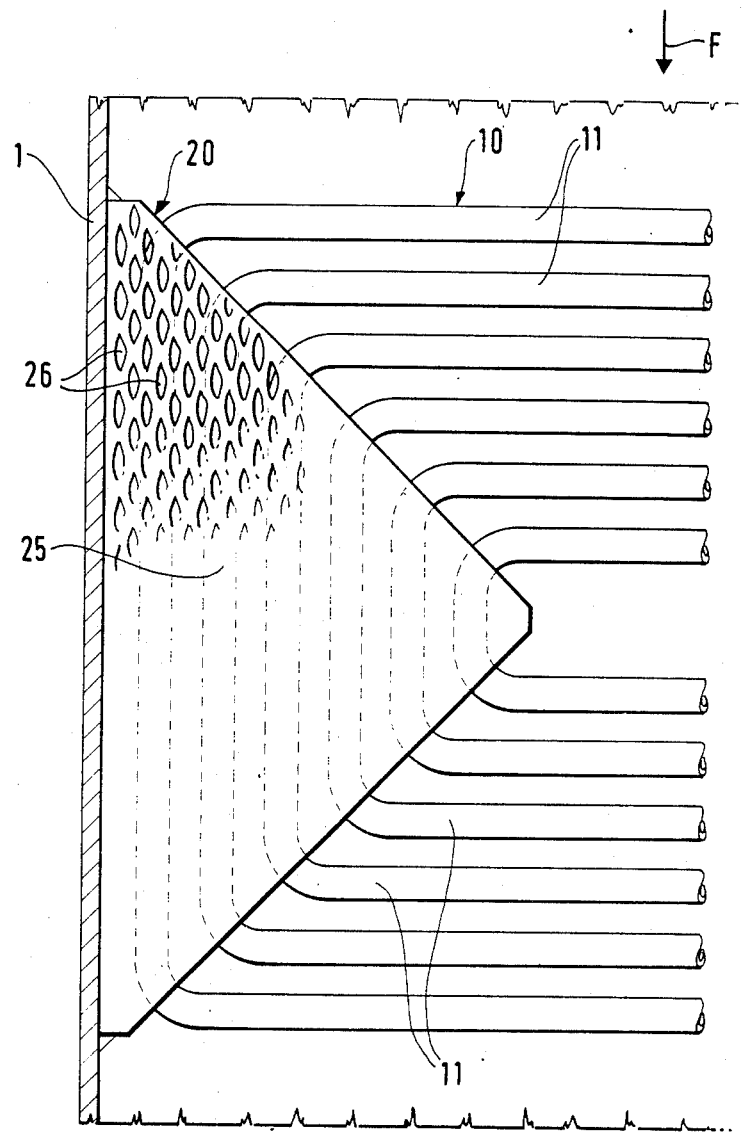
FIG. 5 shows another example of the first embodiment.

FIG. 5 shows a triangular open frame work device 20 constituted by an expanded metal plate 25, with the plate having orifices 26.

Figure 6:
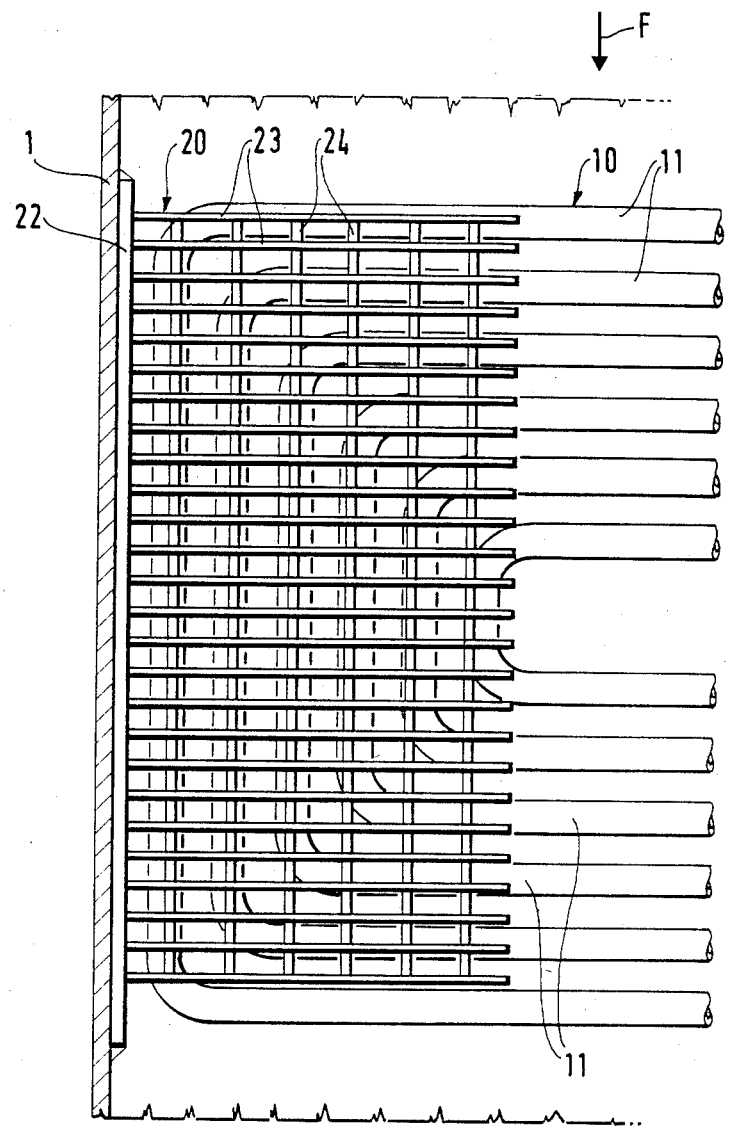
FIG. 6 shows a second embodiment of the device.

FIG. 6 shows a rectangular open frame work device 20 constituted by superposed blades 23 which are fixed at one end to the support plate 22 by any known means. These blades are connected to one another by vertical connections 24, such as blades or twisted wires, for example, thereby providing a slatted type of assembly.

Naturally, all these devices are made of material suitable for the ambient temperature, and in addition they are designed in such a manner as to avoid accumulating ash.

What is claimed is:

1. A protective device for protecting heat exchangers placed within a duct with said duct having smoke filled with fine particles of ash flowing therethrough, the heat exchangers consisting of parallel grids each comprising a main region fitted with rectilinear lengths of tube extending perpendicularly to the direction of smoke movement, and two end regions fitted with bends coupling rectilinear lengths of tube extending parallel to the direction of smoke movement to the lengths of tube extending perpendicularly to the smoke movement, said protective device comprising a plurality of panels fixedly located respectively between each adjacent pair of grids of tubes in each of said end regions, with said panels extending parallel, to the grids of tubes and wherein each panel comprises an open framework assembly having an active portion as an obstacle having a resistance to the passage of smoke which is substantially equivalent to that of the obstacle presented by the main regions constituted by the lengths of rectilinear tubes perpendicular to the direction of smoke movement.

2. A protective device according to claim 1 wherein each panel is generally triangular in shape and being sized to and covering said rectilinear lengths of tube that lie parallel to the direction of smoke movement.

3. A protective device according to claim 1 wherein each panel is generally rectangular in shape and is sized to and covers an entire end region.

* * * * *